(12) United States Patent
Donato et al.

(10) Patent No.: US 9,324,101 B2
(45) Date of Patent: Apr. 26, 2016

(54) USER CUSTOMIZED GREETING CARD DESIGN SYSTEM WITH PORTAL FOR CROWD-SOURCED ARTWORK

(71) Applicant: Card Isle Corporation, Blacksburg, VA (US)

(72) Inventors: Adam Armido Donato, Blacksburg, VA (US); David Austin Henry, Pocono Lake, PA (US); Stephan James Sabo, New Philadelphia, OH (US)

(73) Assignee: Card Isle Corporation, Blacksburg, VA (US)

( * ) Notice: Subject to any disclaimer, the term of this patent is extended or adjusted under 35 U.S.C. 154(b) by 0 days.

(21) Appl. No.: 14/263,110

(22) Filed: Apr. 28, 2014

(65) Prior Publication Data

US 2015/0310520 A1    Oct. 29, 2015

(51) Int. Cl.
  *G06Q 30/06*    (2012.01)
  *G06F 3/0482*   (2013.01)
  *G06Q 30/02*    (2012.01)
  *G06Q 50/00*    (2012.01)

(52) U.S. Cl.
  CPC .......... *G06Q 30/0621* (2013.01); *G06F 3/0482* (2013.01); *G06Q 30/0209* (2013.01); *G06Q 30/0237* (2013.01); *G06Q 50/01* (2013.01)

(58) Field of Classification Search
  None
  See application file for complete search history.

(56) References Cited

U.S. PATENT DOCUMENTS

| | | | | |
|---|---|---|---|---|
| 5,036,472 | A | | 7/1991 | Buckley et al. ............... 364/479 |
| 5,056,029 | A | | 10/1991 | Cannon ......................... 364/468 |
| 5,513,117 | A | * | 4/1996 | Small ............................ 700/233 |
| 5,555,496 | A | | 9/1996 | Tackbary et al. ......... 364/401 R |
| 5,615,123 | A | | 3/1997 | Davidson et al. ........ 364/479.03 |
| 6,092,054 | A | | 7/2000 | Tackbary et al. ............... 705/27 |
| 6,468,162 | B1 | * | 10/2002 | Nakamura ...................... 463/43 |
| 7,668,619 | B2 | | 2/2010 | Torian .......................... 700/233 |
| 7,797,378 | B2 | | 9/2010 | Friedman et al. ............. 709/203 |
| 8,351,190 | B1 | | 1/2013 | Sneed et al. .............. 361/679.01 |
| 2003/0004997 | A1 | * | 1/2003 | Parker et al. ................. 707/513 |
| 2009/0069929 | A1 | | 3/2009 | Nguyen et al. ............... 700/233 |
| 2011/0257780 | A1 | | 10/2011 | Cosgrove ..................... 700/117 |
| 2013/0275505 | A1 | * | 10/2013 | Gauglitz et al. .............. 709/204 |

* cited by examiner

*Primary Examiner* — Mohammad Ghayour
*Assistant Examiner* — Christopher D Wait
(74) *Attorney, Agent, or Firm* — Sheppard Mullin Richter & Hampton LLP (57) ABSTRACT

The invention relates to systems and methods of providing a user customized card design system with a portal used to receive crowd-sourced artwork that users may select to include in customized greeting cards, games for bonuses that can be applied to customized greeting cards, and greeting card kiosks that may have different portions each having a dedicated functionality. The crowd-sourced content items may include items that are provided by various entities so that others may use the items in their own greeting cards. The crowd-sourced content items may be localized such that crowd-sourced content items within a proximity of a given location may be used to customize greeting cards at or in association with the given location. The bonuses may be won during gameplay and may include free or discounted customized greeting cards, free or discounted customization options, and/or other value.

21 Claims, 6 Drawing Sheets

USER CUSTOMIZED GREETING CARD DESIGN SYSTEM WITH PORTAL FOR CROWD-SOURCED ARTWORK

FIELD OF THE INVENTION

The invention relates to systems and methods of providing a user customized card design system with a portal used to receive crowd-sourced artwork that users may select to include in customized greeting cards, providing games for bonuses that can be applied to customized greeting cards, and providing greeting card kiosks that may have different portions each having a dedicated functionality.

BACKGROUND OF THE INVENTION

Greeting card publishers provide a wide array of greeting cards that are available at retail locations. However, oftentimes it may be difficult for a customer to find the perfect greeting card for a given occasion and/or recipient. Conventional greeting card customization systems (such as online electronic greeting card systems) are typically limited by the types of customizations that are available, do not provide a high quality print, and/or fail to engage users in the greeting card customization process. These and other drawbacks exist.

SUMMARY OF THE INVENTION

The invention addressing these and other drawbacks relates to systems and methods of providing a user customized card design system with a portal used to receive crowd-sourced artwork that users may select to include in customized greeting cards, providing games for bonuses that can be applied to customized greeting cards, and providing greeting card kiosks that may have different portions each having a dedicated functionality. The system may receive and process one or more greeting card design parameters used to create a custom greeting card. The greeting card design parameters may include a specification of one or more crowd-sourced content items, a specification of one or more customization options, and/or other information used to generate a custom greeting card.

The crowd-sourced content items may include items that are provided by various entities so that others may use the crowd-sourced content items in their own greeting cards. The crowd-sourced content items may be localized. For example and without limitation, the system may provide photographs taken by other users of local landmarks, artwork sourced from local artists, and/or other localized crowd-sourced content items.

The system may provide one or more games (via one or more components described herein) that allow the user to win a bonus that can be used in association with a greeting card customization. For example, the bonus may include a discounted price off of a customized greeting card, a discounted or free crowd-sourced content item, a discounted or free customization option (e.g., a special font, paper quality, print resolution, etc.), and/or other benefit. The bonus may be associated with a crowd-sourced content item or a customization option that is provided only by winning the bonus (e.g., is not otherwise available for selection). The game may be free to play such that the bonus may be achieved (and applicable to a greeting card customization) regardless of whether the user actually purchases a customized greeting card or not.

Users may specify the one or more greeting card design parameters in various ways. For example, the system may include a greeting card kiosk that provides a user interface used to specify greeting card design parameters. The greeting card kiosk may print the user-customized greeting card and/or provide an electronic version of the customized greeting card (e.g., an "e-greeting card"). In this manner, the user may design and obtain a user-customized greeting card at a greeting card kiosk.

A given greeting card kiosk may include one or more portions that each may include a display (e.g., a touch screen display), one or more inputs (which may or may not be incorporated into the display), a printer, a payment input (e.g., a card reader, a smart chip reader, a Near-Field Communication reader, etc.), and/or other components. A given portion may allow users to design a greeting card using the user interface provided by the given portion. Another portion of the given greeting card kiosk may include a print-only portion that only prints greeting cards that have been already customized (which may be identified by a code described below) and does not allow greeting card customization at the kiosk. In this manner, a given kiosk may service users that design custom greeting cards at the kiosk and simultaneously service other users that simply pick up already customized greeting cards, minimizing wait times for the users.

The system may provide a user interface via a network (e.g., a website via the Internet) used to specify greeting card design parameters. The user may logon to a website, for example, and customize greeting cards, which may be printed via a user's printer, and/or provided as an e-greeting card. The system may also transmit greeting card design parameters received via the website to a kiosk for printing the user-customized greeting card. In this manner, the user may design a custom greeting card via a website and indicate a kiosk at which to print the customized greeting card. The system may provide the user with a code or other identification information that identifies the greeting card design parameters. Upon entry of the code at the greeting card kiosk, the greeting card kiosk may obtain the greeting card design parameters associated with the code and print the user-customized greeting card.

The system may allow a user to design a custom greeting card using a mobile application and transmit the custom greeting card (e.g., the greeting card parameters) to a nearby greeting card kiosk, which prints the custom greeting card via the portion dedicated to handle greeting card specifications. In this example, the user may establish a direct connection with a given greeting card kiosk (e.g., via BLUETOOTH or other connection), and transmit the greeting card parameters via the direct connection. Alternatively, the mobile application may transmit a code and the greeting card parameters to the system via a network. The user may input the code at the greeting card kiosk, which obtains the greeting card parameters from the system using the code. In this manner, in some implementations, the print-only portion of the kiosk may be used to only "pick up" already customized cards (eg, ones designed using/sent from the system and/or user device).

The system may be used not only with respect to customizing and printing greeting cards, but customizing and creating other objects as well. In particular, the system may be used to generate customized three-dimensional objects using three-dimensional printers. In this context, the crowd-sourced content items may include one or more three-dimensional models for shapes that may be incorporated into a customized three-dimensional print. The customization options may include a type of material used to generate the three-dimensional print, a complexity of the three-dimensional shape (e.g., as defined by a number of laminations, depositions, material binding, and/or other three-dimensional printing processes that may be more or less complex than other types of processes), and/or other customizations.

Instead of a greeting card specification described herein, for example, the system may generate a three dimensional (digital) model that incorporates the shapes and/or customization options. The model may be used to form a solid three-dimensional shape using conventional three-dimensional printing systems. The three-dimensional model may be developed/customized from scratch by a user or may be customized using a template, using the various features described herein. An at-home three-dimensional printer and/or a kiosk having a three-dimensional printer may be used to print the user-customized object.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
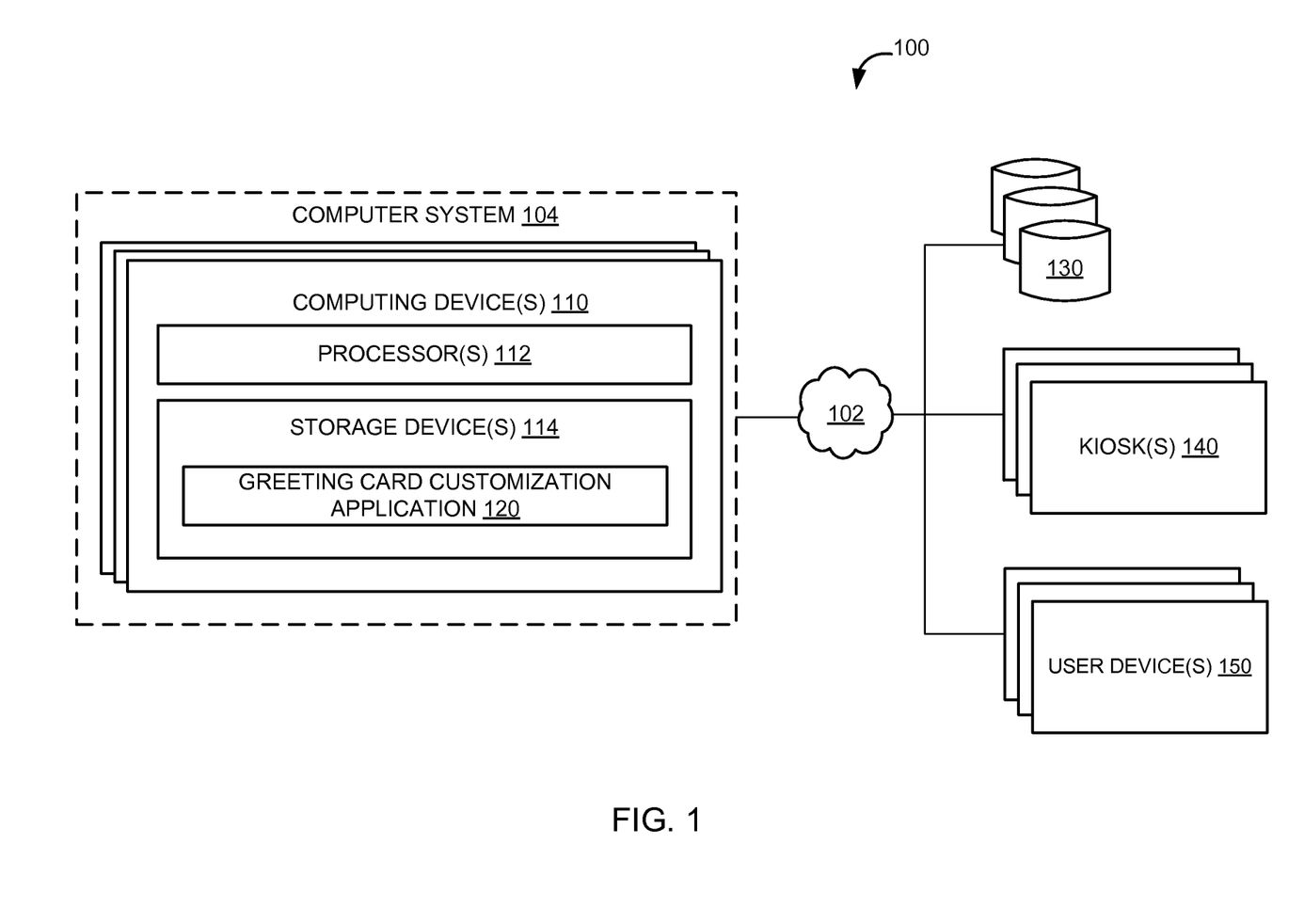
FIG. 1 illustrates a system of customizing greeting cards, according to an implementation of the invention.

FIG. 1 illustrates a system 100 for customizing greeting cards, according to an implementation of the invention. System 100 may generate user-customized greeting cards by providing a user-selectable listing of various crowd-sourced content items and customization options. Upon receipt of a selection of the crowd-sourced content items and/or customization options, the system may generate a greeting card specification, which specifies the selections, used to generate a customized greeting card. The customized greeting card may be provided as a printed greeting card (e.g., via a kiosk) or an electronic greeting card (e.g., over a network as an appropriate graphical image such as PDF, PNG, JPEG, etc.), which may be printed later.

The crowd-sourced content items may include items that are provided by various entities so that others may use the crowd-sourced content items in their own greeting cards. The crowd-sourced content items may be localized. For example and without limitation, the system may provide photographs taken by other users of local landmarks, artwork sourced from local artists, and/or other localized crowd-sourced content items.

The system may provide one or more games that allow the user to win a bonus that can be used in association with a greeting card customization. For example, the bonus may include a discounted price off of a customized greeting card, a particular crowd-sourced content item, a customization option (e.g., a special font), and/or other benefit. The bonus may be associated with a crowd-sourced content item or a customization option that is provided only by winning the bonus (e.g., is not otherwise available for selection). The game may be free to play such that the bonus may be achieved (and applicable to a greeting card customization) regardless of whether the user actually purchases a customized greeting card or not. The game may be played via a kiosk, via a client device, and/or other device that has access to the system.

Other uses of system 100 are described herein and still others will be apparent to those having skill in the art. For example, the system may be used not only with respect to customizing and printing greeting cards, but customizing and creating other objects as well. In particular, the system may be used to generate customized three-dimensional objects using three-dimensional printers. In this context, the crowd-sourced content items may include one or more three-dimensional models for shapes that may be incorporated into a customized three-dimensional print. The customization options may include a type of material used to generate the three-dimensional print, a complexity of the three-dimensional shape (e.g., as defined by a number of laminations, depositions, material binding, and/or other three-dimensional printing processes that may be more or less complex than other types of processes), and/or other customizations.

Instead of a greeting card specification described herein, for example, the system may generate a three dimensional (digital) model that incorporates the shapes and/or customization options. The model may be used to form a solid three-dimensional shape using conventional three-dimensional printing systems. The three-dimensional model may be developed/customized from scratch by a user or may be customized using a template, using the various features described herein. An at-home three-dimensional printer and/or a kiosk having a three-dimensional printer may be used to print the user-customized object.

Having described a high level overview of some of the system functions, attention will now be turned to various system components that facilitate these and other functions.

System 100 may include a computer system 104, one or more kiosks 140, one or more user devices 150, and/or other components. Each of the various components of system 100 may be communicably coupled to at least one other component, facilitating various ways in which the user may customize a greeting card. For example, and without limitation, the user may customize a greeting card at greeting card kiosk 140, via one or more websites or other interfaces provided by computer system 104, via an application of a user device 150 (e.g., a mobile application running on a smartphone, a tablet computer, etc.), and/or other device that can provide the various greeting card design interfaces described herein.

A user may make selections of crowd-sourced content items and/or customization options at a given greeting card kiosk 140. In an implementation, greeting card kiosk 140 may service multiple users simultaneously. For example, to minimize waiting times, a given user may be able to print a customized greeting card while another user is customizing a greeting card at the kiosk.

A given greeting card kiosk 140 may include one or more portions that each may include a display (e.g., a touch screen display), one or more inputs (which may or may not be incorporated into the display), a printer, a payment input (e.g., a card reader, a smart chip reader, a Near-Field Communication reader, etc.), and/or other components. A given portion may allow users to design a greeting card using the user interface provided by the given portion. Another portion of the given greeting card kiosk may include a print-only portion that only prints greeting cards that have been already customized and does not allow greeting card customization at the kiosk.

For example, a user may design a custom greeting card using a mobile application and transmit the custom greeting card to a nearby kiosk, which prints the custom greeting card via the portion dedicated to handle greeting card specifications. In this manner, in some implementations, the print-only portion of the kiosk may be used to only "pick up" already customized cards (eg, ones designed using/sent from computer system 104 and/or user device 150). In this manner, a given kiosk may service users that design custom greeting cards at the kiosk and simultaneously service other users that simply pick up already customized greeting cards, minimizing wait times for the users.

Computer system 104 may provide a greeting card design interface (e.g., in the form of a website or other interface) that is used to customize a greeting card. The user may access the card design interface (e.g., via the Internet) to customize a greeting card. Once a greeting card is customized, the user may cause a greeting card specification that specifies the customizations to be transmitted to a particular greeting card kiosk 140 (e.g., one nearby the user) that prints the greeting card. On the other hand, the user may simply download the customized greeting card and print the customized greeting card using a local printer (not illustrated in FIG. 1).

Computer system 104 may also provide the greeting card specification or an image of the customized greeting card to a user device 150 for printing at a printer connected to the user device. Similarly, the user may customize a greeting card using his/her own user device 150, which may generate and provide the greeting card specification to a specified greeting card kiosk 140 that prints the greeting card. The user device 150 may provide the greeting card specification to the specified greeting card kiosk 140 via a network (e.g., the Internet) and/or directly via a wireless connection (e.g., BLUETOOTH) or wired connection to the greeting card kiosk.

Whichever method is used to generate a customized greeting card, a corresponding greeting card specification may be stored in one or more databases (e.g., database(s) 130) in association with the user. In this manner, a history of greeting cards that a given user customized may be later retrieved. In an implementation, the user may allow one or more customization options to be made available for other users. In this manner (apart from personal text, for example), certain customizations may be shared by users so that others may use the customizations as a template for their own custom designs. Such customizations may be stored in the one or more databases so that users may select from among these templates.

Computer system 104 may include one or more computing devices 110. Although only computing device(s) 110 is illustrated as having processor(s) 112, and storage device(s) 114, each of computing device(s) 110, kiosk(s) 140, and user device(s) 150 may include one or more processors 112, one or more storage devices 114, and/or other components. Processor(s) 112 may be programmed by one or more computer program instructions, which may be stored in storage device(s) 114. The one or more computer program instructions may include, without limitation, a greeting card customization application 120. As such, at least a portion of greeting card customization application 120 may program the physical processors of computer system 104, kiosk 140, and/or user device 150 to perform one or more of the various operations described herein.

Figure 2:
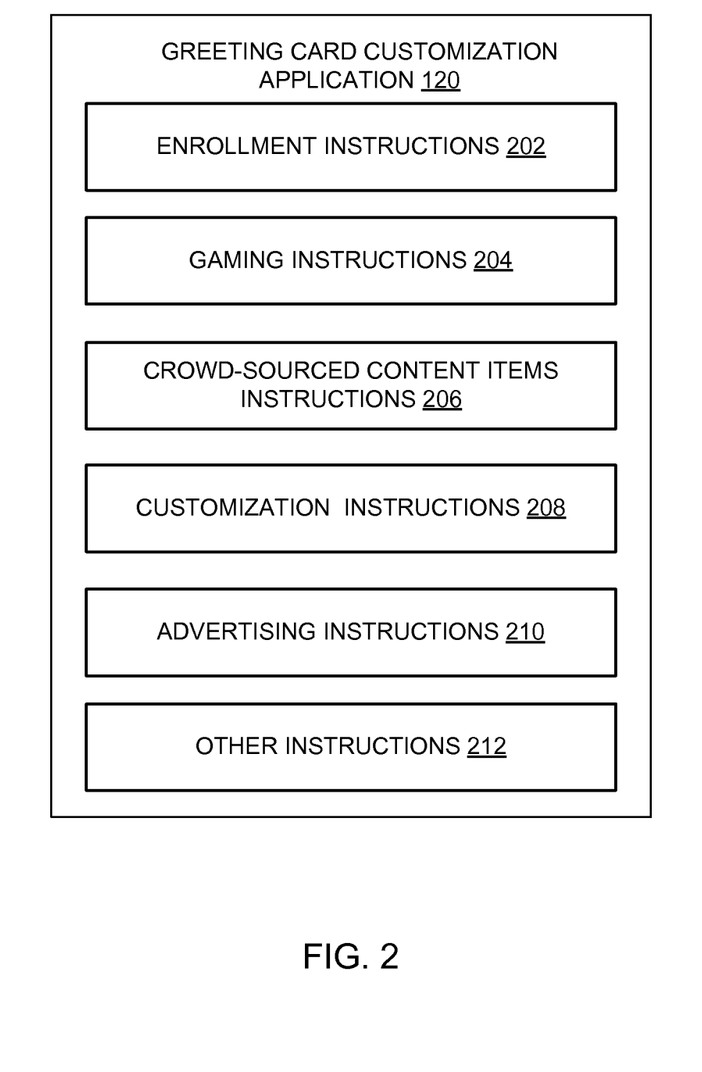
FIG. 2 illustrates a greeting card customization application, according to an implementation of the invention.

Referring now to FIG. 2, greeting card customization application 120 may include, for example, enrollment instructions 202, crowd-sourced content items instructions 204, gaming instructions 206, customization instructions 208, advertising instructions 210, and/or other instructions 212.

In an implementation, enrollment instructions 202 may program a physical processor (e.g., of computer system 104, kiosk 140, and/or user device 150) to enroll a user to use the system. As used hereinafter, for convenience, the various instructions will be described as performing an operation, when, in fact, the various instructions program the processors to perform the operation. Enrollment instructions 202 may enroll a user to create custom greeting cards, sign up to be a provider of crowd-sourced content items, and/or otherwise enroll the user to use the system.

Enrollment instructions 202 may receive user information such as, for example, a full name, user credentials for future logons (e.g., a username and password), demographic information, payment information used to pay for customized greeting cards (e.g., credit card number, debit card number, PAYPAL identifier, etc., although in some implementations, a user may input payment information at a kiosk or otherwise at the time when a purchase takes place), and/or other user information. The user information may be stored in a user account in one or more databases (e.g., database(s) 130).

In an implementation, crowd-sourced content items instructions 204 may receive one or more crowd-sourced content items from a given user that are offered to other users for inclusion into their respective greeting cards. Each crowd-sourced content item may be associated with a location. For example, a photograph may be automatically or manually geocoded such that Exchangeable image file format ("Exif") or other data includes a geotag that indicates the location where the photograph was taken. Crowd-sourced content items instructions 204 may extract the geotag information to obtain the location associated with the photograph.

In other examples, crowd-sourced content items instructions 204 may receive a location of an artist that provided the crowd-sourced content item. In other examples, crowd-sourced content items instructions 204 receive a location depicted by a crowd-sourced content item. In these examples, a provider of the crowd-sourced content item may provide a description of a landmark or other location depicted by the crowd-sourced content item. In any event, a given crowd-sourced content item may be associated with a location so that the location may be used to determine which kiosks or other locations that the given crowd-sourced content item should be made available.

Crowd-sourced content items instructions 204 may provide a crowd-sourced content interface that various devices (e.g., greeting card kiosk 140, user device 150, etc.) may use to upload the crowd-sourced content items. For example, using the crowd-sourced content interface, a user may upload one or more crowd-sourced content items. In another implementation, the crowd-sourced content interface may act as an Application Programming Interface ("API") through which mobile applications and other client-executed applications may use to provide crowd-sourced content items. For example and without limitation, a user's mobile device may be programmed with a mobile application that interfaces with the API to provide crowd-sourced content items. The mobile application may include, for example, a "share" button that allows a user to upload crowd-sourced content items such as photographs to be added to the pool of crowd-sourced content items that may be included by other users in their respective custom greeting cards.

Crowd-sourced content items instructions 204 may monitor the incorporation of any of the crowd-sourced content items in order to allocate a payment or royalty to the provider of the crowd-sourced content items. For example, crowd-sourced content items instructions 204 may track each time that a crowd-sourced content item from a given user is incorporated into a custom greeting card and provide the given user with a payment (or otherwise credit a user account). The royalty may include a cash payment/credit, a discount off a greeting card customization, a free customized greeting card, and/or other value or benefit.

In an implementation, gaming instructions 206 may provide media entertainment such as games, videos, music, images, etc. (hereinafter referred to as "games" for convenience). A given game may include an objective to be achieved, such as a skill-based objective, a chance objective, and/or other objective. Upon satisfaction of the objective, gaming instructions 206 may award the user with a bonus. The bonus may be related to customized greeting cards. For example, the bonus may include a discount off of the purchase price of a customized greeting card, a free customization option that is otherwise not free, a customization option that is not otherwise offered at all unless the objective is achieved, a reduced price customization option, a free customized greeting card, a buy one get one free offer, and/or other bonus that relates to a customized greeting card.

The bonus may be applied to a greeting card being customized and/or be applied to a future customized greeting card for the user. As such, the bonus may be stored in a user account associated with a user who won the bonus. The bonus may be variable such that different levels of bonuses are provided depending on a level of performance of the objective. For example, a bonus may provide a larger discount for higher levels of performance and a lower discount for a lower level of performance. In particular, a game may include a random wheel spin, with each spot on the wheel associated with a different bonus and/or different level of bonus (or not bonus at all). Another game may include providing higher discounts for higher scores. Other types of variable bonuses depending on gameplay may be used as well. Furthermore, other types of interactions with different types of media entertainment may be used to provide bonuses and/or variable bonuses. For example, selection of a displayed advertisement from a sponsored advertiser may result in a bonus, listening to a portion of music may result in a bonus, etc.

In an implementation, customization instructions 208 may provide a user interface that includes a user-selectable listing of one or more customization options and/or crowd-sourced content items. The customization options may include, without limitation, text to be added, a text font, predefined text to be modified, graphics, a card style (e.g., single sheet, bi-fold, multi-fold, etc.), a card orientation (e.g., horizontal, vertical, etc.), a type of occasion (birthday, anniversary, etc), a card size, a paper quality (or other media quality such as different types of plastics, polymers, wires, alloys, etc. used in three-dimensional prints), a print resolution, postage, customer-provided images (e.g., apart from the crowd-sourced content), images taken at a camera of a kiosk (if so equipped), and/or other customizations.

In an implementation, customization instructions 208 may use one or more greeting card templates that may be customized by a user. The template may include one or more components (e.g., graphic, text, etc.) that may be retained, moved, deleted, duplicated, or modified to create a customized greeting card. One or more user-selected crowd-sourced content items and/or one or more user-selected customization options (including custom text input) may be added to the template as well. The template may include text (or prose) that is recommended by the system and may be modified by a given user. Different text may be recommended by the system based on different types of occasions related to a given greeting card and/or based on different themes (e.g., humorous, thoughtful, etc.) of a given greeting card.

In an implementation, other users' customized greeting cards may be used as a template as well. For example, a user may customize a greeting card and grant permission for the system to use the user's customized greeting card as a template for others to use (which may include first removing any personal content such as customized text). In this example, customization instructions 208 may store the user's customized greeting card as a template for later use by others. Furthermore, customization instructions 208 may track the use of such templates in order to allocate a royalty for the providing user. As with the royalty for crowd-sourced content items, the royalty may include a cash payment/credit, a discount off a greeting card customization, a free customized greeting card, and/or other value or benefit.

Upon selection of one or more crowd-sourced content item, one or more customization options, and/or one or more templates, customization instructions 208 may add the selections to a greeting card specification. Once all selections (including user input such as customized text) have been made, customization instructions 208 may generate a customized greeting card using the greeting card specification. For example, customization instructions 208 may generate a print file that is used to print the customized greeting card via a printer of a greeting card kiosk 140. Alternatively or additionally (depending on where the customized greeting card is to be printed), customization instructions 208 may generate an electronic version of the customized greeting card based on the greeting card specification. The electronic version may be emailed, downloaded, stored such that the electronic version is accessible via a link (e.g., a Uniform Resource Locator link), and/or otherwise provided to a recipient.

In an implementation, pricing for the customized greeting card may be based on various pricing factors. For example, the pricing factors may include, without limitation, a selected crowd-sourced content item (some items may be more costly than others—and some may be free), a selected customization option (e.g., selected fonts, types of paper, print resolution, etc.), a selected template, whether a coupon code has been input, any bonuses that were awarded, and/or other pricing factors.

In an implementation, customization instructions 208 may provide a preview of the generated custom greeting card. The preview may include a two-dimensional and/or three-dimensional preview of the custom greeting card. The preview may present a graphical representation of the custom greeting card that is rotatable, opened, closed, and/or otherwise manipulated to provide a user with an ability to view the custom greeting card before purchase and/or before printing.

In an implementation, advertising instructions 210 may obtain advertisements and/or other promotions from one or more advertisers for inclusion into the various interfaces described herein. The advertisements may be stored in one or more advertising databases (e.g., database(s) 130). The advertisements, when selected by a user, may provide additional income to the operator of system 100 through prior agreements between the operator and the advertisers. Furthermore, the system may provide the user with a bonus or other incentive related to a customized greeting card to select or otherwise interact with a given advertisement.

The various instructions described herein are exemplary only. Other configurations and numbers of instructions may be used, so long as the processor(s) 112 are programmed to perform the functions described herein. Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various databases 130 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 3:
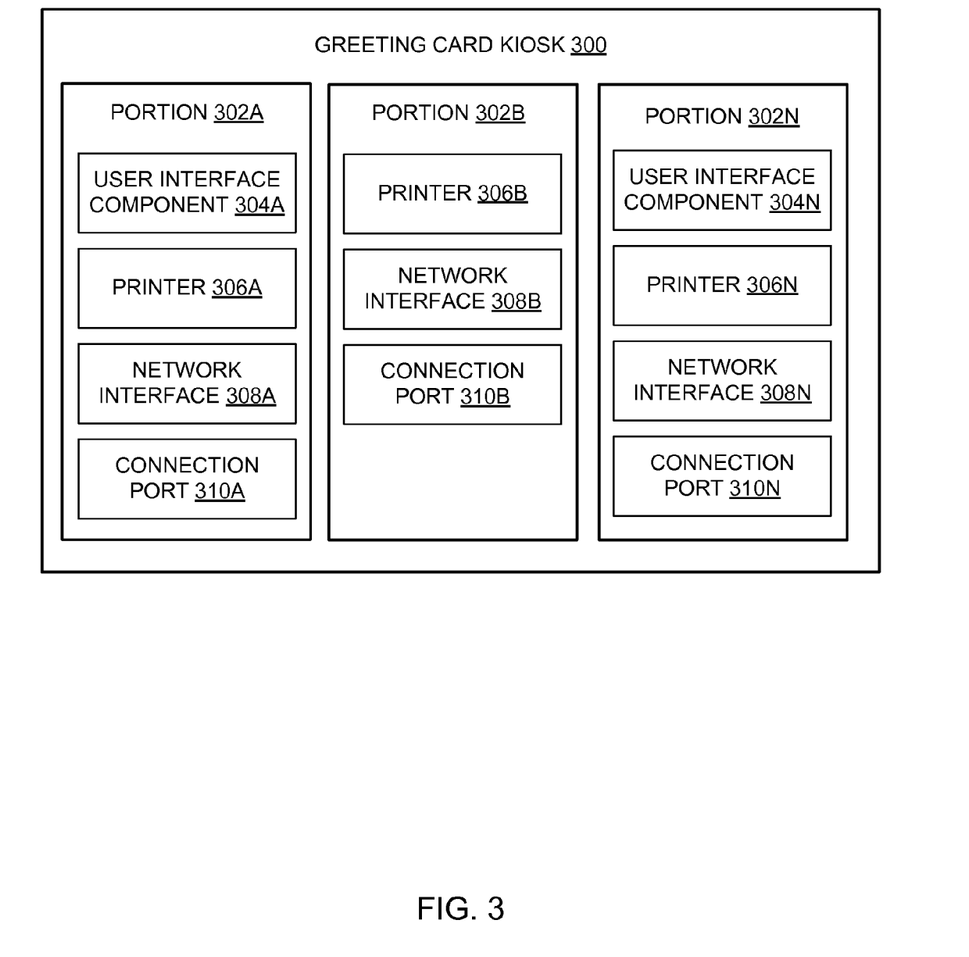
FIG. 3 schematically illustrates a greeting card kiosk for customizing greeting cards, according to an implementation of the invention.

FIG. 3 schematically illustrates a greeting card kiosk 300 for customizing greeting cards, according to an implementation of the invention. As illustrated, greeting card kiosk 300 may include one or more different portions 302 (illustrated in FIG. 3 as portions 302A, 302B, . . . , 302N). A given portion 302 may be the same as (e.g., have identical components) or be different from (e.g., have different components) another given portion 302. As illustrated, portion 302A is different from portion 302B and therefore they may each provide different functions. However, greeting card kiosk 300 (as illustrated) should not be viewed as limiting. For example, a greeting card kiosk may include only a single portion 302 or have multiple portions 302 that are identical to one another.

Each portion 302 may be modular in that any one of several portions 302 may be connected to one another to form a greeting card kiosk 300 having an arbitrary number of portions 302. In other examples, each portion 302 may be manufactured together with other portions such that they form a unitary structure. Furthermore, each portion 302 may be configured or arranged with respect to other portions according to particular needs (and not necessarily placed in a side-by-side configuration), so long as each portion 302 is accessible by a respective user. Of course, greeting card kiosk 300 may instead include only a single portion 302.

A given portion 302 may include one or more components, such as, without limitation, a user interface component 304, a printer 306, a network interface 308, a direct wireless or wired communication port 310, a payment input 312, and/or other components. User interface component 304 may include a display (e.g., a touch screen or other display), one or more user inputs such as a keyboard, and/or other user interface components. When not used to customize a greeting card, the display may provide graphical movements and other media content to attract users to the greeting card kiosk. The user inputs may be standalone (e.g., a hard keyboard separate from the display) and/or may be incorporated within the display itself (e.g., a soft keyboard provided by the display).

Printer 306 may print a customized greeting card. Printer 306 may include, for example, an Inkjet printer, a laser printer, and/or other type of printer that can print in color and/or black and white.

Network interface 308 may allow portion 302 to communicate via a network (such as the Internet). Direct wireless or wired communication port 310 may allow portion 302 to directly communicate with a user device (e.g., via BLUETOOTH or other direct wireless/wired connection).

Payment input 312 may include a reader that can read a payment device such as a credit card, debit card, smart chip, NFC-enabled payment device, and/or other payment devices. This allows the user to pay at the kiosk (although the user may also or alternatively pay using a pre-stored payment account as described herein, along with verification of user credentials).

As illustrated, portion 302A includes a user interface component 304A, a printer 306A, a network interface 308A, a direct wireless or wired communication port 310A, and a payment input 312A. In this manner, portion 302A may be considered a "full service" portion that allows a user to design a custom greeting card using the user interface component 304A and print the custom greeting card once designed. The user may also import, via network interface 308A and/or direct wireless or wired communication port 310A, a greeting card that was previously customized.

As illustrated, portion 302B includes a printer 306B, a network interface 308B, a direct wireless or wired communication port 310B and a payment input 312B. Portion 302N includes a user interface component 304N, a printer 306N, a network interface 308N, a direct wireless or wired communication port 310N, and a payment input 312N. Because portion 302B does not include a user interface component 304A, portion 302B may be considered a "print-only" portion that allows the user to print greeting cards that were already customized by the user.

Portion 302B may include minimal inputs to allow the user to enter a code corresponding to the customized greeting card (which may have been already customized from the user's home via a website provided by computer system 104 or from a user's mobile device via a mobile application). Alternatively, the greeting card kiosk may receive the code via network interface 308B and/or direct wireless or wired communication port 310B. For example, the user may provide a command from a mobile application executing on the user's mobile device that causes the code to be transmitted to the greeting card kiosk via the Internet (or other network) and/or via BLUETOOTH (or other direct wireless connection). In some implementations, the greeting card kiosk may include an identifier affixed on a surface of the kiosk that may be entered into the user's mobile device in order to properly address the greeting card kiosk and/or portion of the greeting card kiosk.

As illustrated, portion 302N may be considered a full service kiosk based on its components. In an implementation, a given portion 302 may be switched between a full service portion and a print-only portion. For example, when demand for printing already customized greeting cards is high, greeting card kiosk 300 may switch portion 302N to a print-only portion such that a user may not design a custom greeting card using portion 302N. Likewise, greeting card kiosk 300 may switch portion 302N back to a full service kiosk if demand to design custom greeting cards at the kiosk is high. Of course, this pre-supposes that the portion 302N includes an appropriate user interface component 304.

Figure 4:
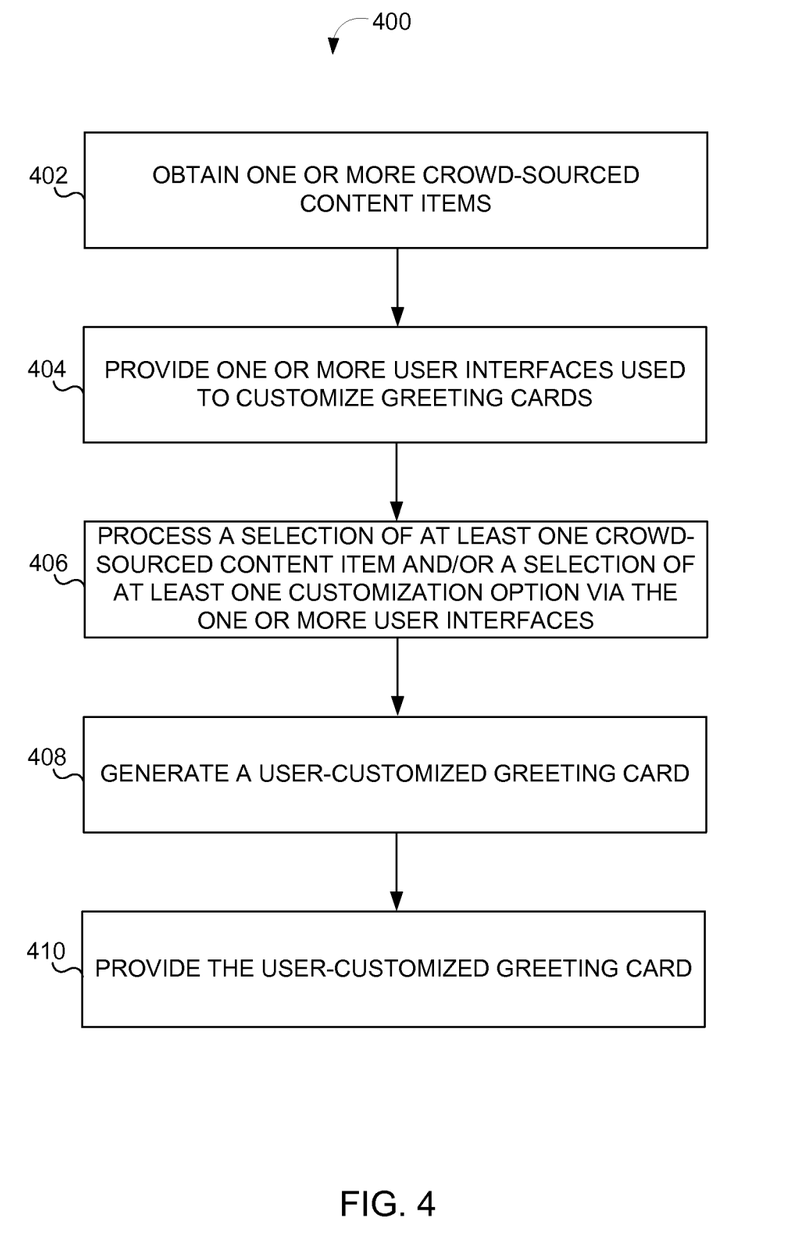
FIG. 4 illustrates a process of customizing greeting cards, according to an implementation of the invention.

FIG. 4 illustrates a process 400 of customizing greeting cards, according to an implementation of the invention. The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 402, one or more crowd-sourced content items that are selectable by a user to be included in a user-customized greeting card may be obtained.

In an operation 404, one or more user interfaces may be provided. The one or more user interfaces may include the one or more crowd-sourced content items for selectable inclusion into the user-customized greeting card, and a first set of one or more customization options that are selectable to customize the user-customized greeting card.

In an operation 406, a selection of at least one crowd-sourced content item and/or a selection of at least one customization option via the one or more user interfaces may be received and processed. For example, a user may select a greeting card template, customize the cover and/or customize any inside portion of the greeting card (if the greeting card includes an inside portion). Such customizations can include addition of at least one crowd-sourced content item and/or selection of at least one customization option.

In an operation 408, the user-customized greeting card based on the at least one crowd-sourced content item and the at least one customization option may be generated. In an operation 410, the user-customized greeting card may be provided by printing the user-customized greeting card, providing the user-customized greeting card in an electronic form to the user or other recipient, and/or otherwise providing a representation of the user-customized greeting card.

Figure 5:
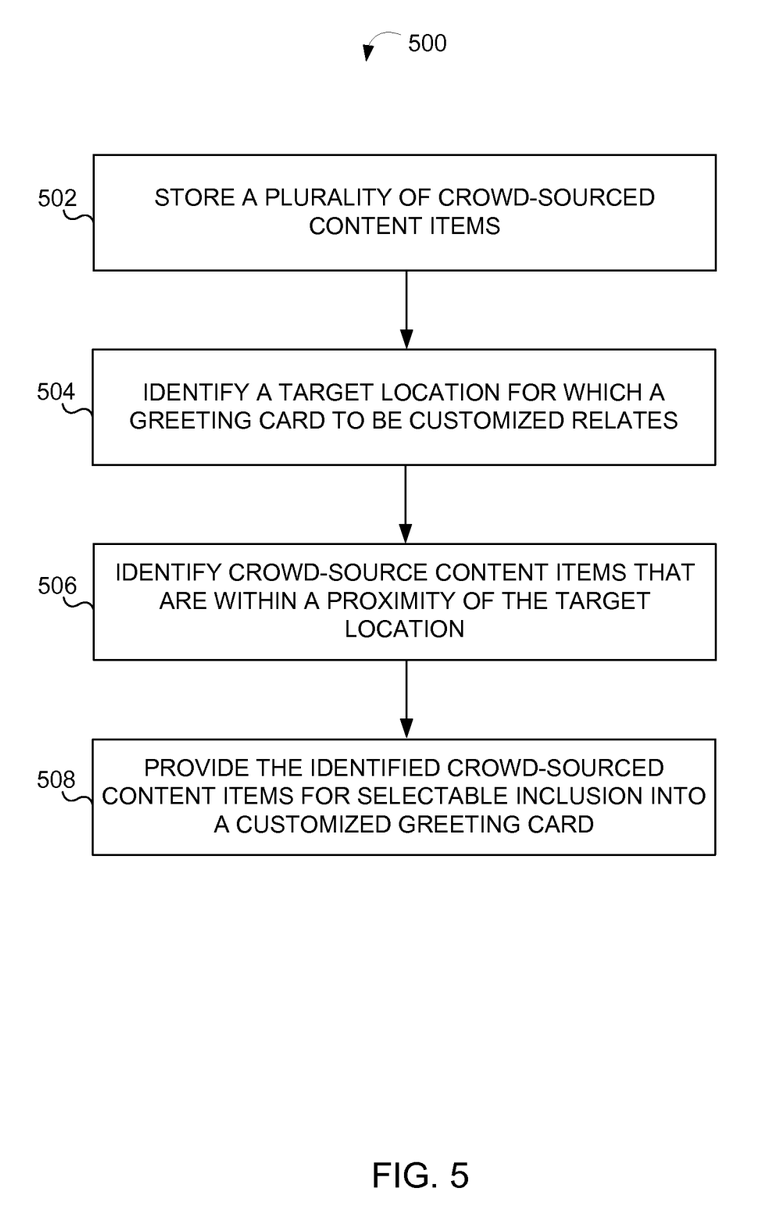
FIG. 5 illustrates a process of localizing crowd-sourced content items for selectable inclusion in custom greeting cards, according to an implementation of the invention.

FIG. 5 illustrates a process 500 of localizing crowd-sourced content items for selectable inclusion in custom greeting cards, according to an implementation of the invention.

In an operation 502, a plurality of crowd-sourced content items may be stored. For example, the crowd-sourced content items may be stored in one or more databases. An individual crowd-sourced content item may be associated with a location. For example, the location be a location from which the crowd-sourced content item was created, a location depicted by the item, a location associated with an artist or other provider of the item, and/or other location associated with the item.

In an operation 504, a target location for which a greeting card to be customized relates may be identified. For example, a target location may include the location of a greeting card kiosk where a greeting card is to be customized. In this example, the location of the greeting card kiosk may be used to identify crowd-sourced content items to provide to the greeting card kiosk. In another example, a target location may include the location of a user device (e.g., identified based on Global Positioning System, cell tower localization, and/or other location techniques). In this manner, the user device may be provided with crowd-sourced content items that are specific to the location of the user device. In another example, a target location may include a location that is input by the user. In this manner, the user may customize a greeting card using crowd-sourced content items that relate to the location that the user chooses (e.g., the user would like to create a postcard to commemorate a vacation at a particular locale and include crowd-sourced content items related to the locale).

In an operation 506, crowd-sourced content items that are within a proximity of the target location may be identified. The proximity may be expressed as a circular area defined by a radius and the target location. The proximity may be predefined and/or configurable by a user or the system. In an operation 508, the identified crowd-sourced content items may be provided for selectable inclusion into a customized greeting card.

Figure 6:
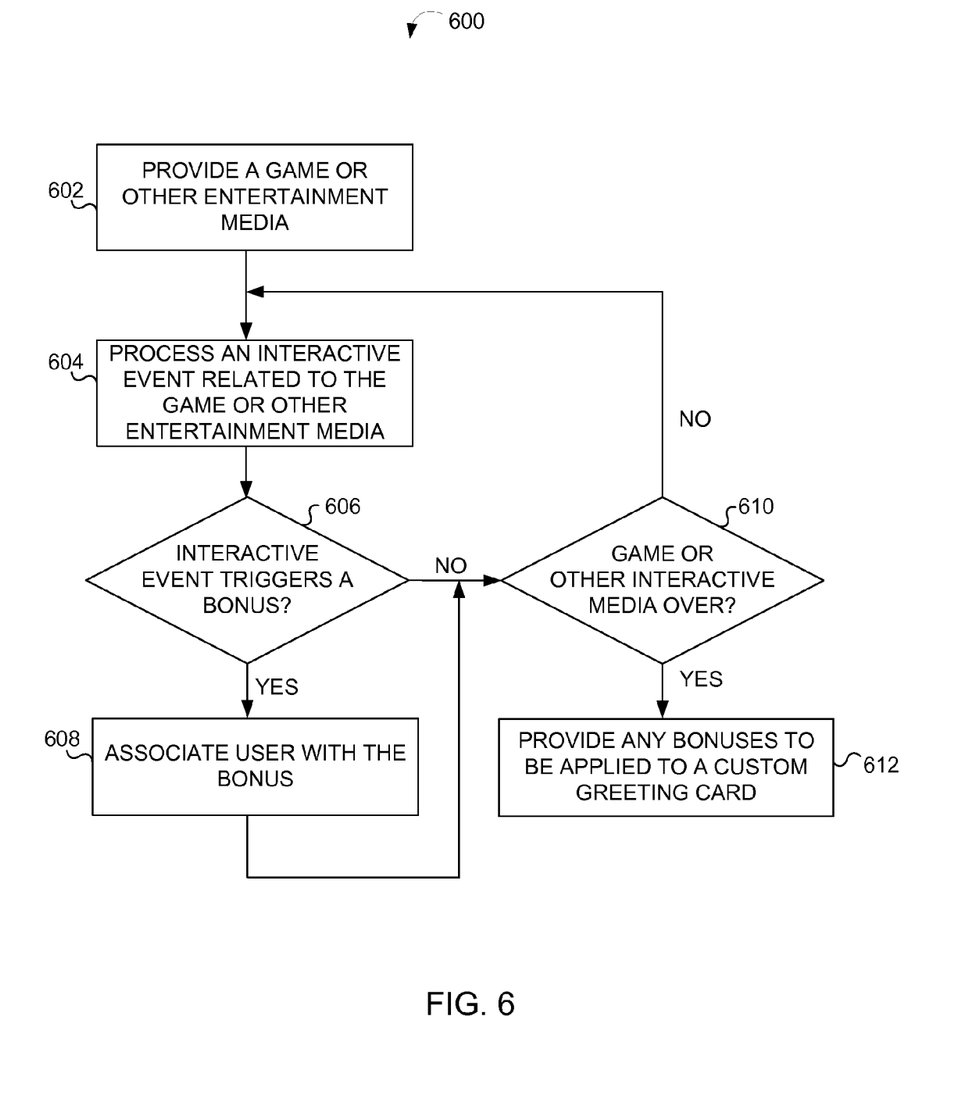
FIG. 6 illustrates a process of providing bonuses related to custom greeting cards based on gameplay and other interactions with media entertainment, according to an implementation of the invention.

FIG. 6 illustrates a process 600 of providing bonuses related to custom greeting cards based on gameplay and other interactions with media entertainment, according to an implementation of the invention.

In an operation 602, a game or other entertainment media may be provided. The game or other entertainment media may be provided via a greeting card kiosk, a user interface (e.g., website) of a computer system that provides greeting card customizations, a mobile application at a user device, and/or other communication channel through which the game or other entertainment media may be provided.

In an operation 604, an interactive event related to the game or other entertainment media may be received and processed. For example, the interactive event may include an in-game input by the user, an in-game action by the game's artificial intelligence, a passage of time viewing media content such as videos, and/or other interactive event.

In an operation 606, a determination of whether the interactive event triggers a bonus related to the custom greeting card may be made. For example, a user may perform some game objective that merits a bonus that may be used in association with customizing a greeting card. If the interactive event triggers a bonus, then the bonus may be associated with the user (e.g., in a memory and/or user account of the user) in an operation 608.

In an operation 610, a determination of whether the game or other entertainment media is over may be made. If the game or other entertainment media is over, any bonuses accumulated during the game or other entertainment media may be provided in an operation 612. On the other hand, if the game or other entertainment media is not over, then processing may return to operation 604, where an interactive event may be received.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A greeting card kiosk for customizing greeting cards, the greeting card kiosk comprising:
    a first portion comprising a first printer, and a first display device, the first display device configured to display one or more user interfaces for customizing greetings cards, wherein an individual greeting card is customizable to include crowd-sourced content items and one or more customization options used to customize the individual greeting card;
    one or more processors programmed with computer program instructions that, when executed by the one or more physical processors, program the greeting card kiosk to:
    obtain one or more crowd-sourced content items that are selectable by a user to be included in a user-customized greeting card;
    generate and provide the one or more user interfaces via the first display, wherein the one or more user interfaces include: (i) the one or more crowd-sourced content items for selectable inclusion into the user-customized greeting card, and (ii) a first set of one or more customization options that are selectable to customize the user-customized greeting card;
    receive a selection of at least one crowd-sourced content item and a selection of at least one customization option via the one or more user interfaces;
    generate the user-customized greeting card based on the at least one crowd-sourced content item and the at least one customization option;
    cause the user-customized greeting card to be printed via the first printer; and
    a second portion, separate from the first portion, comprising a second printer separate from the first printer, wherein the greeting card kiosk is further programmed to:
    receive, via a wired or wireless connection, a communication from a mobile device associated with a second user, the communication comprising a code;
    obtain, based on the code, a greeting card specification that specifies a second user-customized greeting card customized by the second user, wherein the greeting card specification includes an identification of one or more customization options for the second user-customized greeting card;
    generate the second user-customized greeting card based on the greeting card specification; and
    cause the second printer to print the second user-customized greeting card.

2. The greeting card kiosk of claim 1, wherein the one or more crowd-sourced content items comprise crowd-sourced content items that were generated at a location that is within a predefined proximity of a physical location of the greeting card kiosk.

3. The greeting card kiosk of claim 1, further comprising:
    one or more printers that prints the greeting cards, wherein the user-customized greeting card is provided to the user via the one or more printers.

4. The greeting card kiosk of claim 3, wherein the greeting card kiosk is further programmed to:
    provide one or more games while the user-customized greeting card is being printed.

5. The greeting card kiosk of claim 4, wherein the one or more games include an objective to be achieved, and wherein the greeting card kiosk is further programmed to:
    receive an indication that the objective has been achieved; and
    provide a bonus responsive to the indication, wherein the bonus relates to a future greeting card to be customized by the user.

6. The greeting card kiosk of claim 5, wherein the bonus comprises a customization option that is not otherwise provided among the one or more customization options.

7. The greeting card kiosk of claim 6, wherein the bonus comprises a customization option that is ordinarily associated with an additional fee, but is provided at a discounted price or no charge.

8. The greeting card kiosk of claim 1, wherein the greeting card kiosk is further programmed to:
    provide one or more games to play prior to generation of the user-customized greeting card, wherein the one or more games include an objective to be achieved;
    receive an indication that the objective has been achieved; and
    provide a bonus responsive to the indication, wherein the bonus provides a customization option used to customize the user-customized greeting card.

9. The greeting card kiosk of claim 1, wherein the greeting card kiosk is further programmed to:
    provide an electronic version of the user-customized greeting card in an electronic medium through a wired or wireless connection.

10. The greeting card kiosk of claim 1, wherein the wired or wireless connection comprises a direct connection with a mobile device associated with the second user from which the greeting card specification is received.

11. The greeting card kiosk of claim 1, wherein the wired or wireless connection comprises a network connection with a remote computer system from which the greeting card specification is received.

12. A method for customizing greeting cards via a greeting card kiosk comprising a first portion having a first printer and a first display device configured to display one or more user interfaces for customizing greetings cards, wherein an individual greeting card is customizable to include crowd-sourced content items and one or more customization options used to customize the individual greeting card, a second portion separate from the first portion, the second portion having a second printer separate from the first printer, the method comprising:
    obtaining, by the greeting card kiosk, one or more crowd-sourced content items that are selectable by a user to be included in a user-customized greeting card;
    generating and providing, by the greeting card kiosk, the one or more user interfaces via the first display, wherein the one or more user interfaces include: (i) the one or more crowd-sourced content items for selectable inclusion into the user-customized greeting card, and (ii) a first set of one or more customization options that are selectable to customize the user-customized greeting card;

receiving, by the greeting card kiosk, a selection of at least one crowd-sourced content item and a selection of at least one customization option via the one or more user interfaces;

generating, by the greeting card kiosk, the user-customized greeting card based on the at least one crowd-sourced content item and the at least one customization option;

causing, by the greeting card kiosk, the user-customized greeting card to be printed via the first printer;

receiving, by the greeting card kiosk, via a wired or wireless connection, a communication from a mobile device associated with a second user, the communication comprising a code;

obtaining, by the greeting card kiosk, based on the code, a greeting card specification that specifies a second user-customized greeting card customized by the second user, wherein the greeting card specification includes an identification of one or more customization options for the second user-customized greeting card;

generating, by the greeting card kiosk, the second user-customized greeting card based on the greeting card specification; and causing, by the greeting card kiosk, the second printer to print the second user-customized greeting card.

13. The method of claim 12, wherein the one or more crowd-sourced content items comprise crowd-sourced content items that were generated at a location that is within a predefined proximity of a physical location of the greeting card kiosk.

14. The method of claim 12, the method further comprising:
providing, by the greeting card kiosk, one or more games while the user-customized greeting card is being printed.

15. The method of claim 14, wherein the one or more games include an objective to be achieved, and wherein the method further comprising:

receiving, by the greeting card kiosk, an indication that the objective has been achieved; and providing, by the greeting card kiosk, a bonus responsive to the indication, wherein the bonus relates to a future greeting card to be customized by the user.

16. The method of claim 15, wherein the bonus comprises a customization option that is not otherwise provided among the one or more customization options.

17. The method of claim 16, wherein the bonus comprises a customization option that is ordinarily associated with an additional fee, but is provided at a discounted price or no charge.

18. The method of claim 12, wherein the method further comprising:

providing, by the greeting card kiosk, one or more games to play prior to generation of the user-customized greeting card, wherein the one or more games include an objective to be achieved;

receiving, by the greeting card kiosk, an indication that the objective has been achieved; and providing, by the greeting card kiosk, a bonus responsive to the indication, wherein the bonus provides a customization option used to customize the user-customized greeting card.

19. The method of claim 12, wherein the method further comprising:

providing, by the greeting card kiosk, an electronic version of the user-customized greeting card in an electronic medium through a wired or wireless connection.

20. The method of claim 12, wherein the wired or wireless connection comprises a direct connection with a mobile device associated with the second user from which the greeting card specification is received.

21. The method of claim 12, wherein the wired or wireless connection comprises a network connection with a remote computer system from which the greeting card specification is received.

* * * * *